(12) United States Patent
Kuerschner

(10) Patent No.: US 7,147,496 B2
(45) Date of Patent: Dec. 12, 2006

(54) ELECTRICAL CONNECTION DEVICE

(75) Inventor: Sven Kuerschner, Woellstein (DE)

(73) Assignee: Delphi Technologies, Inc., Troy, MI (US)

(*) Notice: Subject to any disclaimer, the term of this patent is extended or adjusted under 35 U.S.C. 154(b) by 0 days.

(21) Appl. No.: 11/313,069

(22) Filed: Dec. 20, 2005

(65) Prior Publication Data

US 2006/0141834 A1 Jun. 29, 2006

(30) Foreign Application Priority Data

Dec. 23, 2004 (EP) .................................. 04030554

(51) Int. Cl.
 *H01R 3/00* (2006.01)
(52) U.S. Cl. ........................................ 439/164; 439/15
(58) Field of Classification Search ................ 439/164, 439/15
 See application file for complete search history.

(56) References Cited

U.S. PATENT DOCUMENTS

| 5,752,843 A | * | 5/1998 | Kawamoto et al. | ......... 439/164 |
| 6,368,127 B1 | * | 4/2002 | Araki et al. | ................ 439/164 |
| 6,764,326 B1 | * | 7/2004 | Matsumoto et al. | ........ 439/164 |

\* cited by examiner

*Primary Examiner*—Truc Nguyen
(74) *Attorney, Agent, or Firm*—David P. Wood

(57) ABSTRACT

Electrical connection device, for arrangement between a steering wheel and a steering column module of a vehicle, which includes a rotor part (2) and a stator part (3) for enclosure of at least one electrical conductor connected to it at the end, in which the rotor part (2) inserted into the stator part (3) is non-rotatably connected with a guide ring (6) mounted in the stator part (3), and a blocking rocker (12) acted upon by a compression spring, to be released by mounting the steering wheel (1), is present for fastening the rotor part (2) in an assembly position. The blocking rocker (12) acts between the guide ring (6) and the stator part (3) so that a relative rotation is prevented when the steering wheel (1) is not installed.

10 Claims, 3 Drawing Sheets

ELECTRICAL CONNECTION DEVICE

Figure 1:
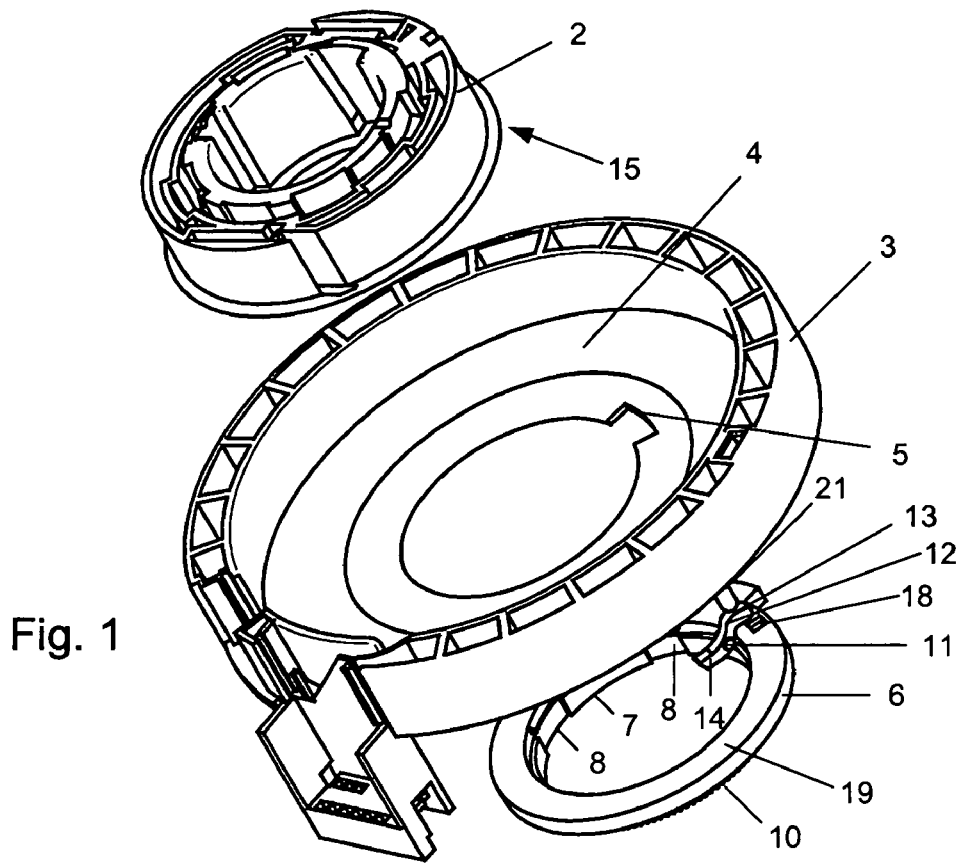

The invention pertains to an electrical connection device, for arrangement between a steering wheel and a steering column module of a vehicle, with a rotor part and a stator part for enclosure of at least one electrical conductor connected to it on one side, in which the rotor part inserted into the stator part is non-rotatably joined with a guide ring mounted in the stator part, and a blocking rocker acted upon by a compression spring, to be released by mounting the steering wheel, is present to fasten the rotor part in an assembly position.

Connection devices of this type are used in particular to make electrical connections between a power supply and an airbag or steering wheel switches of vehicles arranged in the steering wheel lock. In this case a conductor arranged between the stator part and the rotor part that is rotatable relative to it is long enough to be capable of following on both sides a steering excursion amounting to roughly three revolutions, wherein the flexible conductor expands outward during the steering wheel excursion from a center position in one direction to a stop on the stator part, and contracts inward in the other direction to a stop on the rotor part. It is also known to assign a shape-mated restraint to the conductor, which engages the conductor on the periphery and causes defined unwinding or winding of the conductor during a rotational movement of the rotor part.

WO 00/76811 A1 shows a device for transfer of energy, which consists essentially of a housing having a stator assembly and a rotor assembly and at least one flexible line accommodated within an annular cavity of the housing. For securing the rotor assembly in its defined assembly position before mounting the steering wheel, a blocking rocker to be operated by means of a slide is present that is acted upon by a helical compression spring. When mounting of the steering wheel the blocking effect of the blocking rocker is automatically eliminated because an operating element present on the steering wheel acts on the blocking rocker via the slide. During disassembly of the steering wheel, the blocking position of the blocking rocker is automatically restored because of the helical compression spring. In order to guarantee the necessary centered position up to the time of installation of the device, a safety element is fastened on a rotor top part that can only be removed by mechanical destruction of the rotor top. The safety element is mounted so that the opening necessary for activation of the slide is fully covered, for which reason the blocking rocker mounted in the stator assembly cannot be operated.

Moreover, DE 198 07 212 A1 discloses a vehicle steering wheel system with a steering spindle situated in it. The steering wheel system includes a steering wheel module with a steering wheel, a steering wheel hub fastened to it, a back cover and an electrical device, wherein the back cover has an electrical conductor and a drum, having a first alignment formation and a first electrical connection, lying essentially coaxial with the steering wheel hub. The electrical conductor is wound around the drum and connected with its first end to the first electrical connection and with its second end to the electrical device for the steering wheel module. A coupling part connected to the steering column housing is also provided that has a second alignment formation that matches the first alignment formation, as well as a second electrical connection. During assembly of the steering wheel module in the vehicle, the first alignment formation of the drum matches the second alignment formation of the coupling part so that the steering wheel module can only be incorporated in a predetermined alignment in which the first and second electrical connections are aligned with each other and the steering wheel hub is aligned with the steering spindle at a predetermined position. The rear cover includes a locking mechanism for the drum in order to keep it in a predetermined rotational position relative to the steering wheel before the steering wheel module is incorporated in the vehicle, during which the lock can be released after the drum has been aligned to match the coupling part so that the rest of the steering wheel module can be rotated relative to the drum, which is torsionally rigid relative to the coupling part. The lock includes a detent, a clamping element, a rotary pin with which the detent is fastened to rotate on the drum and a lock that is forced by the clamping element into engagement with a mounting element on a cover so that the drum is non-rotating relative to the cover. Upon contact of a part of the detent with an unlocking device on the coupling part, the detent is rotated against the tightening direction by the rotary pin, and the lock is released from the mounting element.

The task of the invention is to devise an electrical connection of the type just mentioned which has a simple and compact design and in which the rotor part is fastened in an assembly position relative to the stator part.

The task is solved according to the invention in that the blocking rocker acts between the guide ring and the stator part so that a relative rotation is prevented with an uninstalled steering wheel.

Because of this expedient the blocking rocker is situated outside of the region in which the conductor runs between the stator part and the rotor part and no additional space is required to incorporate the blocking rocker, for which reason the connection device is made compact. Since the guide ring is connected to rotate in unison with the rotor part, fastening of the rotor part in an assembly position relative to the stator part is guaranteed by the effect of the blocking rocker between the guide ring and the stator part, this fastening being automatically eliminated during assembly of the steering wheel.

In order to provide a connection device that is easy to handle, the guide ring is arranged on the base of the stator part on the side facing away from the rotor part. Consequently the rotor part, because of its non-rotating connection with the guide ring, is held captive within the stator part.

In an advantageous embodiment the rotor part has a support site for the blocking rocker whose locking arm is arranged beneath the rotor part and whose activation arm extends into a free space for accommodating a steering wheel hub. When the steering wheel is mounted, the steering wheel hub enters the free space extending concentrically to a steering column and acts directly on the activation arm of the blocking rocker, for which reason it is not necessary to provide additional components for its activation.

The blocking rocker is expediently configured as S-shaped in cross section. The locking arm is preferably acted upon in the direction of the guide ring by an actuator loaded by a compression spring inserted into the end of the rotor part. Owing to the fact that the locking arm is acted upon by the actuator, the blocking rocker is held in a position in which rotation of the rotor part relative to the stator part is prevented. In addition, this arrangement ensures that neither the blocking rocker nor the actuator projects beyond the outside diameter of the stator part, so that a compact design of the connection device is offered.

In order to block the guide ring relative to the stator part in the fastening position of the locking arm, the locking arm in the fastening position preferably extends into a bottom recess of the stator part. During rotation of the rotor part or the guide ring relative to the stator part, lateral surfaces of the locking arm come into contact with the walls of the recess over a relatively large surface area, for which reason locking withstands a relatively high torque.

In order to stabilize the blocking rocker in the fastening position and to avoid excessive force effects on the support site, the free end of the locking arm in the fastening position preferably lies in a recess in the guide ring.

In a modification, the free end of the steering wheel hub acts upon the activation arm of the blocking rocker during assembly of a steering wheel, so that the blocking rocker pivots against the action of the actuator and the locking arm comes out of the recess in the stator part. Consequently the rotor part with the guide ring is freely rotatable relative to the stator part. During removal of the steering wheel from a steering column extending through the connection device, the steering wheel hub is removed from the activation arm of the blocking rocker and the blocking rocker pivots because of the actuator loaded by the compression spring until the free end of the locking arm comes to lie on the base of the stator part. By a corresponding rotation of the rotor part the locking arm enters the recess of the stator part, and the rotor part with the corresponding guide ring is again fastened relative to the stator part. If during removal of the steering wheel from the steering column the wheels of the vehicle to be steered are in a position for straight travel, the connection device is fastened in its assembly position.

In order to provide the guide ring with an additional function, the guide ring preferably has a toothing on the periphery to drive a measurement gear of a steering angle sensor. Since the guide ring and rotor part rotate together with the steering wheel, synchronous drive of the steering wheel sensor is ensured. Naturally a gear mechanism can be connected to the measurement gear of the steering wheel sensor.

To furnish a relatively simple and stable connection, the rotor part is expediently clipped torque-proof to the guide ring.

It is understood that the features mentioned above and still to be explained below are useable not only in the stated combination, but also in other combinations. The scope of the invention is only defined by the claims.

Figure 2:
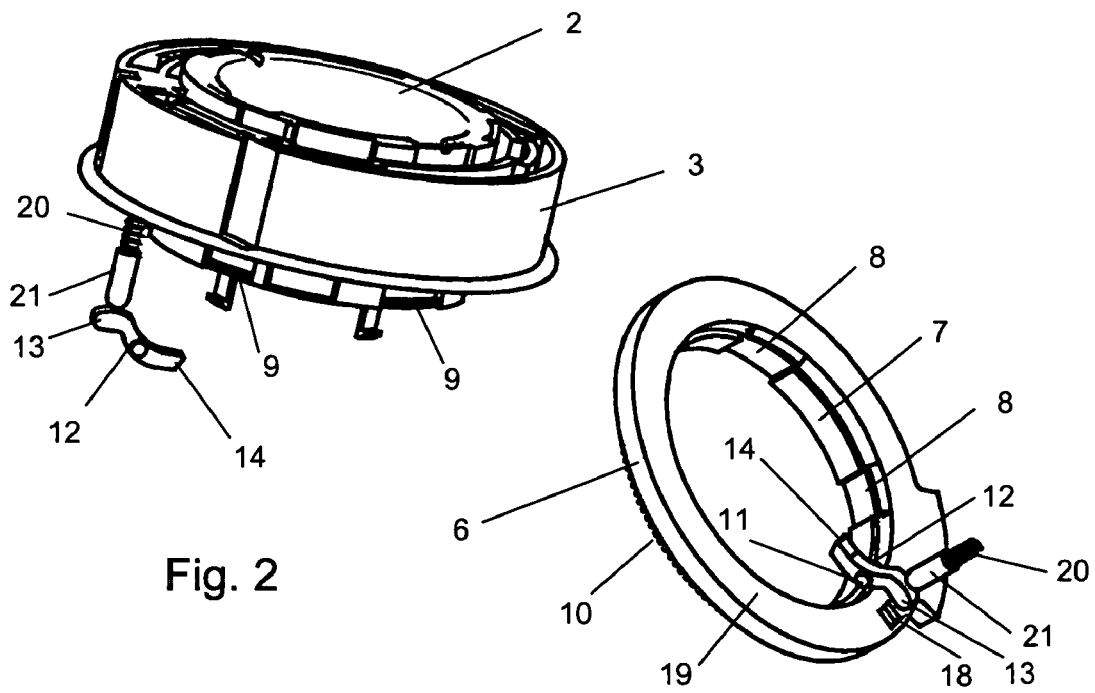
Figure 3:
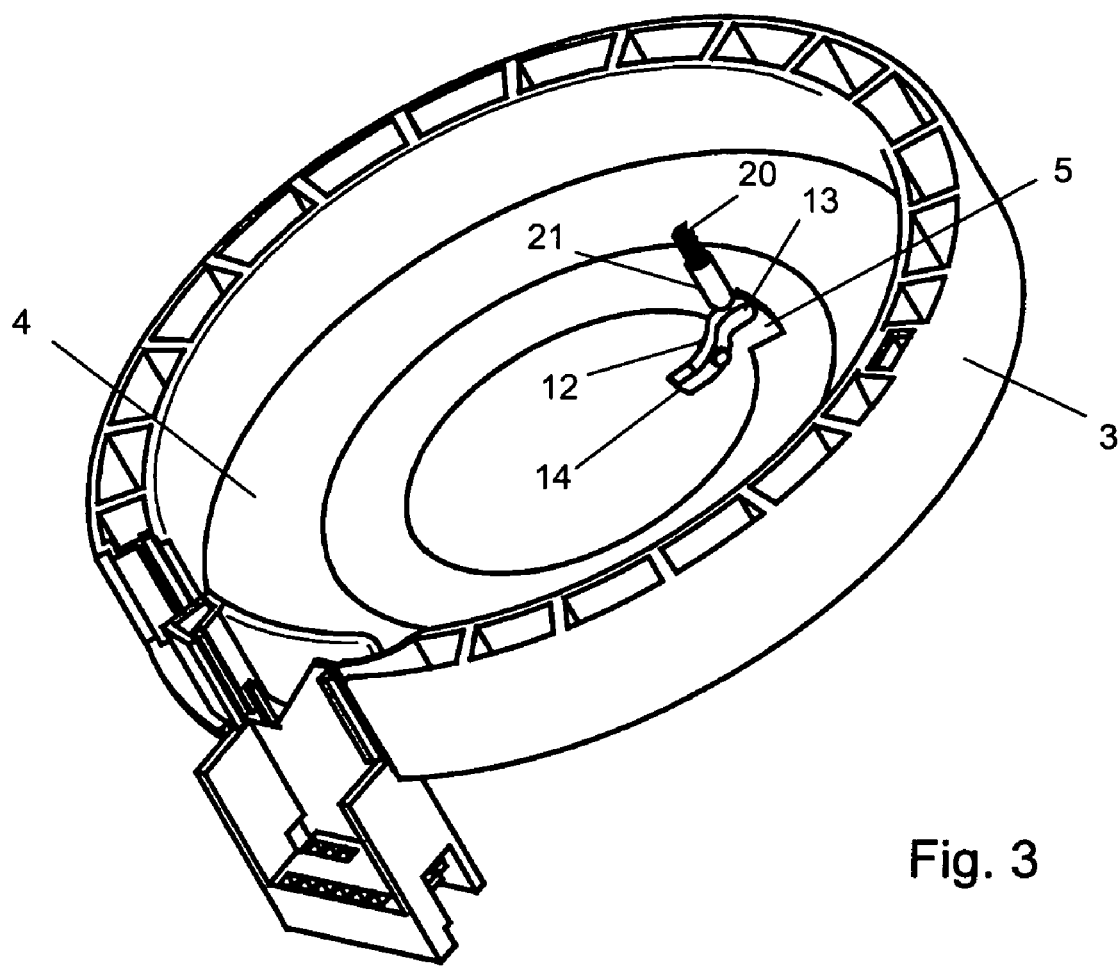
Figure 4:
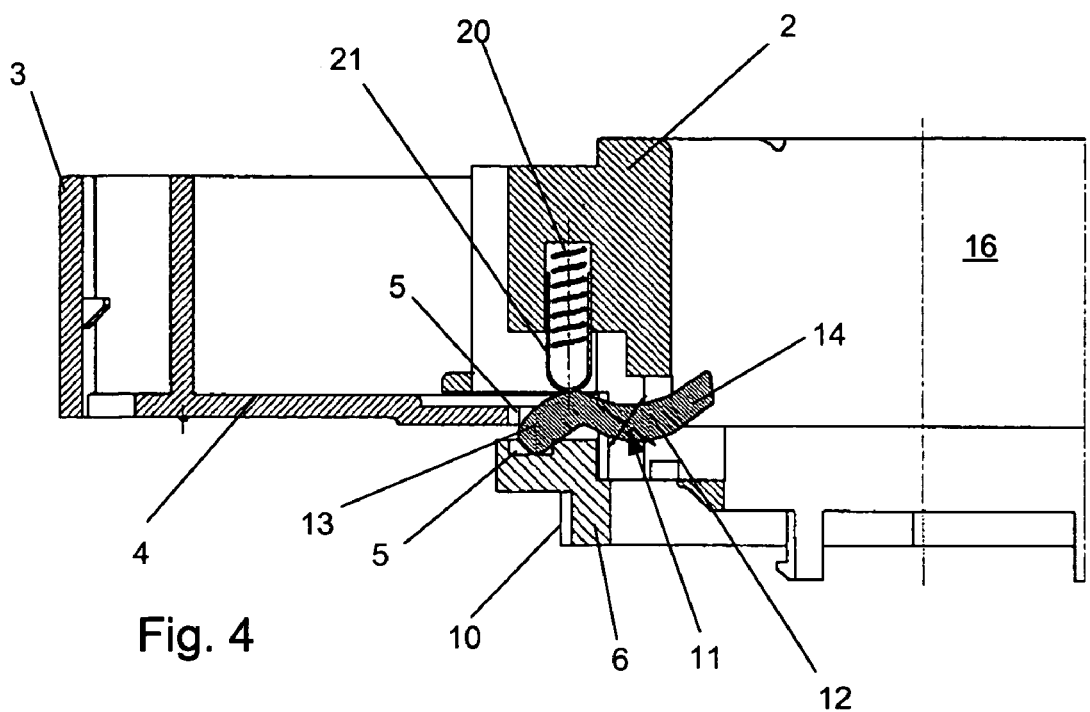
Figure 5:
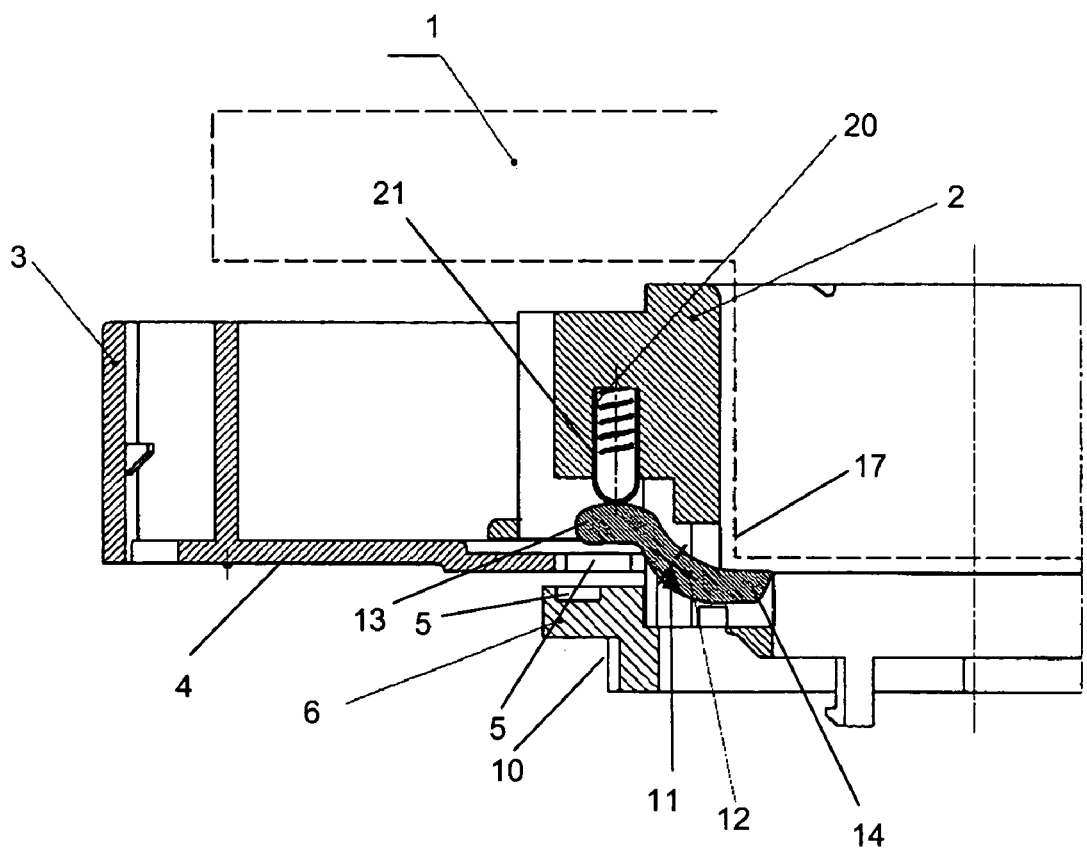

The invention will be further explained below by means of an embodiment with reference to the corresponding drawings. In the drawings:

FIG. 1 shows an exploded oblique view of the connection device according to the invention, FIG. 2 shows another exploded oblique view of the connection device according to FIG. 1, FIG. 3 shows a partial oblique view of the connection device according to FIG. 1, FIG. 4 shows a partial section through the connection device according to FIG. 1, FIG. 5 shows a partial section according to FIG. 4 with a mounted steering wheel.

The electrical connection device for arrangement between steering wheel 1 and its steering column module on a vehicle includes a rotor part 2, which is inserted in a stator part 3 for enclosure with at least one electrical conductor connected to it on the end. The stator part 3 has a base 4 with a recess 5, with the rotor part 2 contacting the base 4 of stator part 3 at the top so that it does not cover recess 5. In order to hold rotor part 2 in the stator part 3, a guide ring 6 is provided on the base 4 of stator part 3 on the side opposite rotor part 2, the inside wall 7 of which has recesses 8 into which clips 9 of the rotor part 2 engage in order to connect rotor part 2 in torque-proof fashion with guide ring 6. The flange-like guide ring 6 has toothing 10 on the periphery to drive a measurement gear of a steering angle sensor (not shown). A support position for a blocking rocker 12, configured S-shaped in cross section, is formed on the rotor part 2. The blocking rocker 12 includes a locking arm 13 as well as an activation arm 14, with the locking arm 13 extending beneath the corresponding face 15 of the rotor part and the activation arm 14 projecting into a free space 16 that accommodates a steering wheel hub 17 of steering wheel 1.

In the assembly position of the connection device, with the steering wheel not mounted, the activation arm 14 of locking rocker 12 is acted upon by an actuator loaded by a compression spring inserted into rotor part 2 on the end, so that the free end of the activation arm 14 enters a recess 18 made in the face 19 of guide ring 6 so that the blocking rocker 12 is stabilized in the fastening position against torque, and excess force effects on the support location are avoided. The locking arm 13 of the blocking rocker 12 is situated in the bottom recess 8 of stator part 3 so that rotation of the rotor part 2 as well as guide ring 6 relative to stator part 3 is prevented. During assembly of steering wheel 1, the steering wheel hub 17 acts upon the activation arm 14 of blocking rocker 12, which then pivots against the effect of compression spring 20 so that the locking arm 13 emerges from the recess 5 of stator part 3. Consequently, the rotor part 3, as well as the guide ring 6, are freely rotatable relative to stator part 3. The S-shaped configuration of the blocking rocker 12 favors both action of the activation arm 14 and also sliding of the actuator 21 loaded by the compression spring on the locking arm 13 during pivoting of the blocking rocker 12.

The invention claimed is:

1. Electrical connection device for arrangement between a steering wheel and a steering column module of a vehicle comprising: a rotor and a stator for enclosure of at least one electrical conductor connected to the stator on one side, wherein the rotor is inserted into the stator and is non-rotatably connected with a guide ring mounted in the stator, wherein a blocking rocker is acted upon by a compression spring, so as to fasten the rotor in an assembly position and to release the rotor by mounting the steering wheel to the steering column module, and wherein the blocking rocker acts between the guide ring and the stator so that a relative rotation is prevented when the steering wheel is not installed.

2. Connection device according to claim 1, wherein the guide ring is arranged on a base of the stator on a side facing away from the rotor.

3. Connection device according to claim 1, wherein the rotor has a support site for the blocking rocker, which includes a locking arm arranged beneath rotor and an activation arm extending into a free space for accommodating a steering wheel hub.

4. Connection device according to claim 1, wherein the blocking rocker is configured as S-shaped in cross section.

5. Connection device according to claim 3, wherein the locking arm is acted upon in the direction of guide ring by an actuator loaded by a compression spring inserted into the end of the rotor.

6. Connection device according to claim 3, wherein the locking arm, when in the fastening position, extends into a bottom recess in the stator.

7. Connection device according to claim 3, wherein a free end of the locking arm, when in the fastening position, occupies a recess in the guide ring.

8. Connection device according to claim 6, wherein a free end of the steering wheel hub acts upon the activation arm when the steering wheel is assembled, so that the blocking rocker pivots against the action of the actuator and the locking arm emerges from the recess in the stator.

9. Connection device according to claim 1, wherein the guide ring has toothing on its periphery to drive a measurement gear of a steering angle sensor.

10. Connection device according to claim 1, wherein the rotor is firmly clipped to the guide ring.

* * * * *